United States Patent
Akrabi et al.

(10) Patent No.: US 11,803,400 B2
(45) Date of Patent: Oct. 31, 2023

(54) METHOD AND SYSTEM FOR ASYNCHRONOUS NOTIFICATIONS FOR USERS IN CONTEXTUAL INTERACTIVE SYSTEMS

(71) Applicant: International Business Machines Corporation, Armonk, NY (US)

(72) Inventors: Offer Akrabi, Akko (IL); Ari Volcoff, Kiryat Tivon (IL); Eliezer Segev Wasserkrug, Haifa (IL); Erez Lev Meir Bilgory, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 16/911,434

(22) Filed: Jun. 25, 2020

(65) Prior Publication Data

US 2021/0406046 A1    Dec. 30, 2021

(51) Int. Cl.
*G06F 9/451* (2018.01)
*G06F 9/54* (2006.01)
*G06F 16/9032* (2019.01)

(52) U.S. Cl.
CPC .............. *G06F 9/453* (2018.02); *G06F 9/542* (2013.01); *G06F 16/90332* (2019.01)

(58) Field of Classification Search
CPC .... G06F 9/453; G06F 9/542; G06F 16/90332; G06F 3/167
See application file for complete search history.

(56) References Cited

U.S. PATENT DOCUMENTS

| | | | | |
|---|---|---|---|---|
| 11,368,420 B1* | 6/2022 | Crook | ............... | G06F 40/274 |
| 2014/0074483 A1* | 3/2014 | van Os | ............... | G10L 15/22 704/275 |
| 2014/0365885 A1* | 12/2014 | Carson | ............... | G06F 16/3344 715/708 |
| 2015/0356136 A1* | 12/2015 | Joshi | ............... | G06F 16/29 707/769 |
| 2016/0283463 A1* | 9/2016 | M R | ............... | G06F 16/243 |
| 2017/0083622 A1* | 3/2017 | Blanco | ............... | H04L 51/046 |
| 2017/0228240 A1* | 8/2017 | Khan | ............... | G06F 16/438 |
| 2018/0277108 A1* | 9/2018 | Badr | ............... | G06F 16/90335 |
| 2018/0322380 A1* | 11/2018 | Aggarwal | ............... | G06N 20/00 |
| 2018/0373398 A1 | 12/2018 | Seixeiro | | |
| 2019/0228766 A1* | 7/2019 | White | ............... | G06Q 10/109 |
| 2019/0362712 A1* | 11/2019 | Karpukhin | ............... | G06F 40/30 |

(Continued)

*Primary Examiner* — Rami R Okasha
(74) *Attorney, Agent, or Firm* — G.E. Ehrlich Ltd.

(57) ABSTRACT

A terminal server of a virtual assistant system for proactively triggering notifications is disclosed. The terminal server is configured to: receive data indicative of a change of a service related state associated with a user of at least one terminal client; generate accordingly a close-ended type question; instruct a transmission of the close-ended type question to the at least one terminal client; in response to a retransmission request, received from the at least one terminal client in relation to the transmission: not perform the close-ended type question, access a storage of the service related state to generate accordingly a new close-ended type question, instruct a transmission of the new close-ended type question to the at least one terminal client, analyze a closed type answer provided by the at least one terminal client, and instruct transmission of a current response to the answer provided by the user.

7 Claims, 4 Drawing Sheets

(56) References Cited

U.S. PATENT DOCUMENTS

Figure 1:
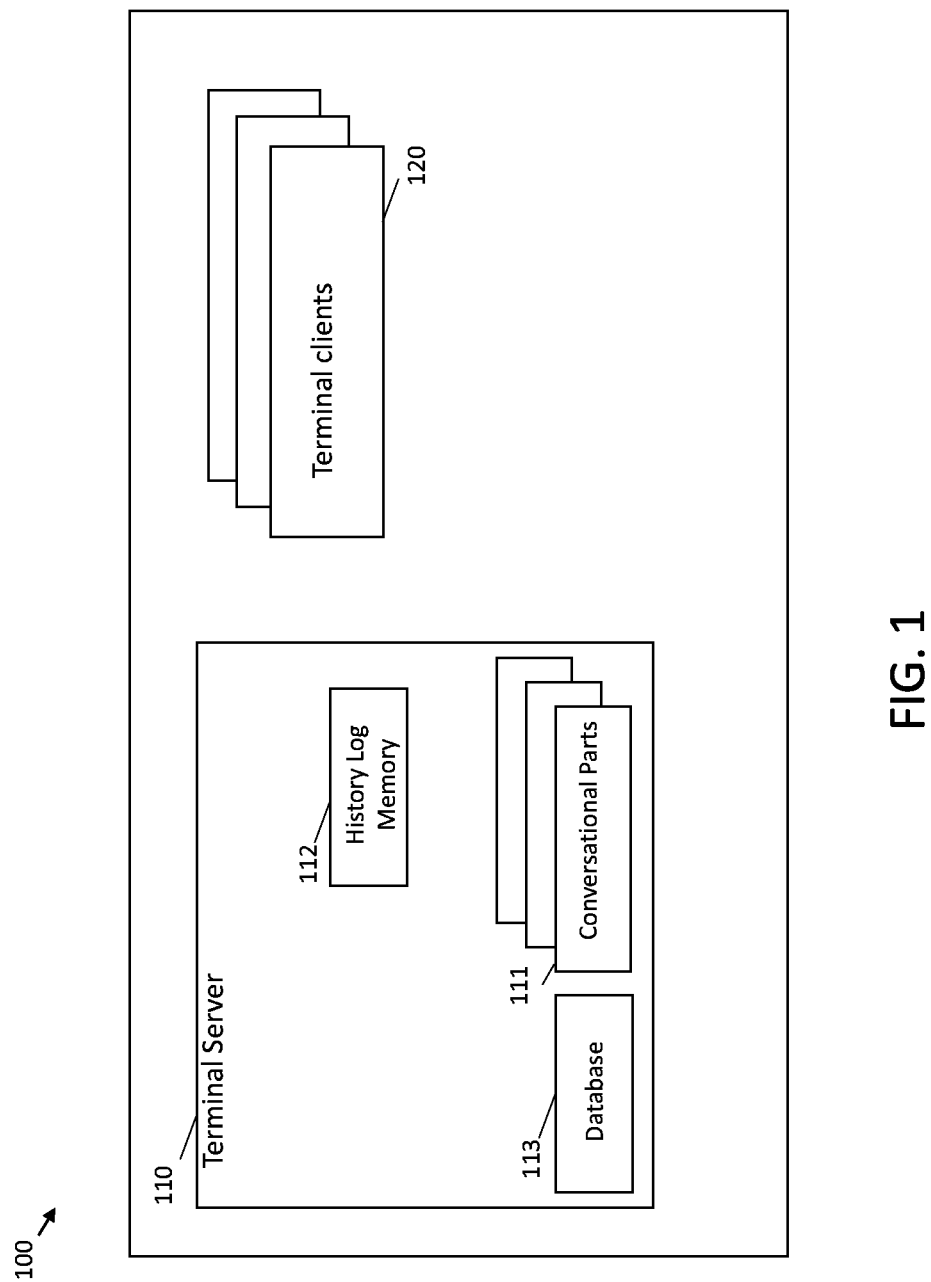

| | | | | |
|---|---|---|---|---|
| 2020/0090641 A1* | 3/2020 | Kim | ................. | H04L 51/02 |
| 2020/0210649 A1* | 7/2020 | Lewis | ................. | G06F 40/20 |
| 2021/0119955 A1* | 4/2021 | Penov | ................. | G06V 20/30 |
| 2021/0272570 A1* | 9/2021 | Gupta | ................. | G10L 15/222 |
| 2021/0326344 A1* | 10/2021 | Schaller | ................. | G06F 16/9035 |

* cited by examiner continuation

METHOD AND SYSTEM FOR ASYNCHRONOUS NOTIFICATIONS FOR USERS IN CONTEXTUAL INTERACTIVE SYSTEMS

TECHNICAL FIELD

Some embodiments described in the present disclosure relate to interactive systems and, more specifically, but not exclusively, to a method and system for asynchronous notifications for users in contextual interactive systems.

BACKGROUND

A virtual assistant is a system that interacts with users using natural language. Virtual assistant systems have specific conversation abilities. The specific conversation capabilities may be implemented in a modular way; specific conversations are handled by specific parts of the virtual assistant system. The virtual assistant system interfaces with the user through devices. The devices may include mobile devices, smart speakers, or smart speakers that are integrated into other physical devices such as cars, rooms, home appliances and the like. Each device has very different capabilities. For instance, each device has different interfaces and different data that the device has on the user. For example, some devices contain screens. Some devices can vibrate. A car may know that when it is moving at a speed of 60 mph then the user is in the car for at least the next five seconds. A room may know when the user is in the room, and whether another conversation is taking place currently in the room.

SUMMARY

It is an object of the present disclosure to describe a system and a method for proactively triggering notifications and close-ended type questions in a virtual assistant system.

The foregoing and other objects are achieved by the features of the independent claims. Further implementation forms are apparent from the dependent claims, the description and the figures.

In one aspect the present disclosure relates to a terminal server of a virtual assistant system, for proactively triggering notifications, configured to: receive data indicative of a change of a service related state associated with a user of at least one terminal client; access a storage of the service related state to generate accordingly a close-ended type question; instruct a transmission of the close-ended type question to the at least one terminal client;

in response to a retransmission request received from the at least one terminal client in relation to the transmission:

not perform the close-ended type question, access the storage of the service related state to generate accordingly a new close-ended type question; instruct a transmission of the new close-ended type question to the at least one terminal client; analyze a closed type answer provided by the at least one terminal client; and instruct transmission of a current response to the answer provided by the user.

In a further implementation the terminal server is further configured to record the new close-ended type question at a history log memory, thereby activating a conversational part responsible for the theme of the close-ended type question to be aware the conversational part is in a middle of a conversation flow and to be able to understand an incoming utterance from the user and to keep the virtual assistant system aware of the conversational context of the conversation regarding the close-ended type question with the user.

In a further implementation the terminal server is further configured to: delete the not performed close-ended type question from a history log memory; or delete the not performed close-ended type question from a history log memory and store the not performed close-ended type question in a database for future use; or skip the not performed close-ended type question.

In a second aspect the disclosure relates to a terminal client of a virtual assistant system, for proactively triggering notifications, configured to:

in a first tine interval, receive a close-ended type question relating to a change of a service related state associated with a user from a terminal server of the virtual assistant system to trigger to a user;

identify a time to ask the user the close-ended type question and request a retransmission of the close-ended question from the terminal server in a delay from the first time interval;

receive a new close-ended question; and ask the new close-ended question to the user; and provide a current response to an answer provided by the user.

In a further implementation identify a proper time to ask the user the close-ended type question, is done when the user triggers the notification consumption.

In a further implementation ask the new close-ended question to the user is done as a response to a trigger from the user or proactively without receiving any trigger from the user.

In a third aspect the disclosure relates to a method for managing a proactive notification triggering of a virtual assistant system, by a terminal server, comprising:

receiving data indicative of a change of a service related state associated with a user of at least one terminal client;

accessing a storage of the service related state to generate accordingly a close-ended type question;

instructing a transmission of the close-ended type question to the at least one terminal client;

identifying a time to ask the user the close-ended type question by the at least one terminal client and request a retransmission of the close-ended question from the terminal server;

in response to a retransmission request received from the at least one terminal client in relation to the transmission:

not performing the close-ended type question;

accessing the storage of the service related state to generate accordingly a new close-ended type question;

instructing a transmission of the new close-ended type question to the at least one terminal client;

analyzing a closed type answer provided by the at least one terminal client, and instructing transmission of a current response to the answer provided by the user.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

Figure 2:
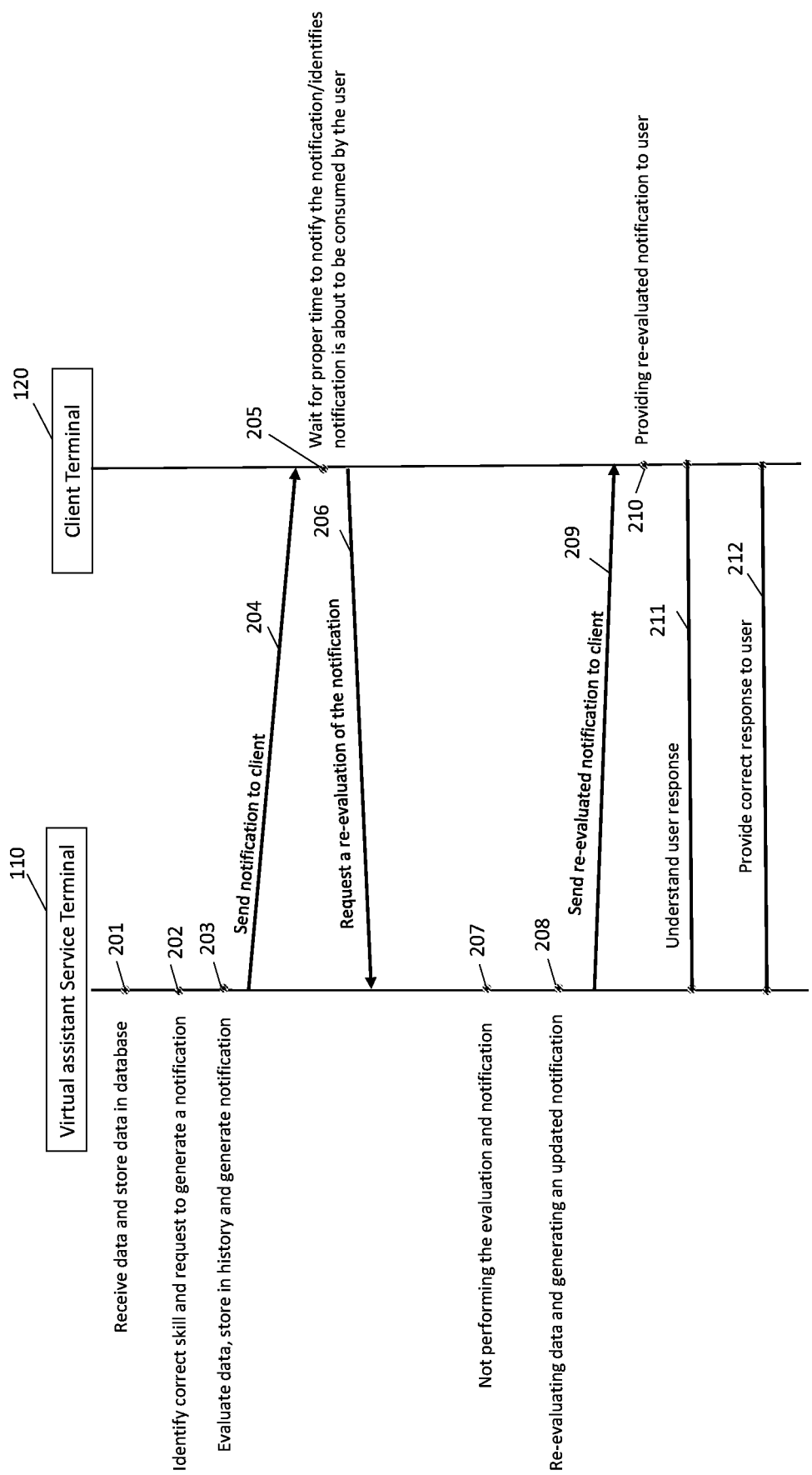
Figure 3:
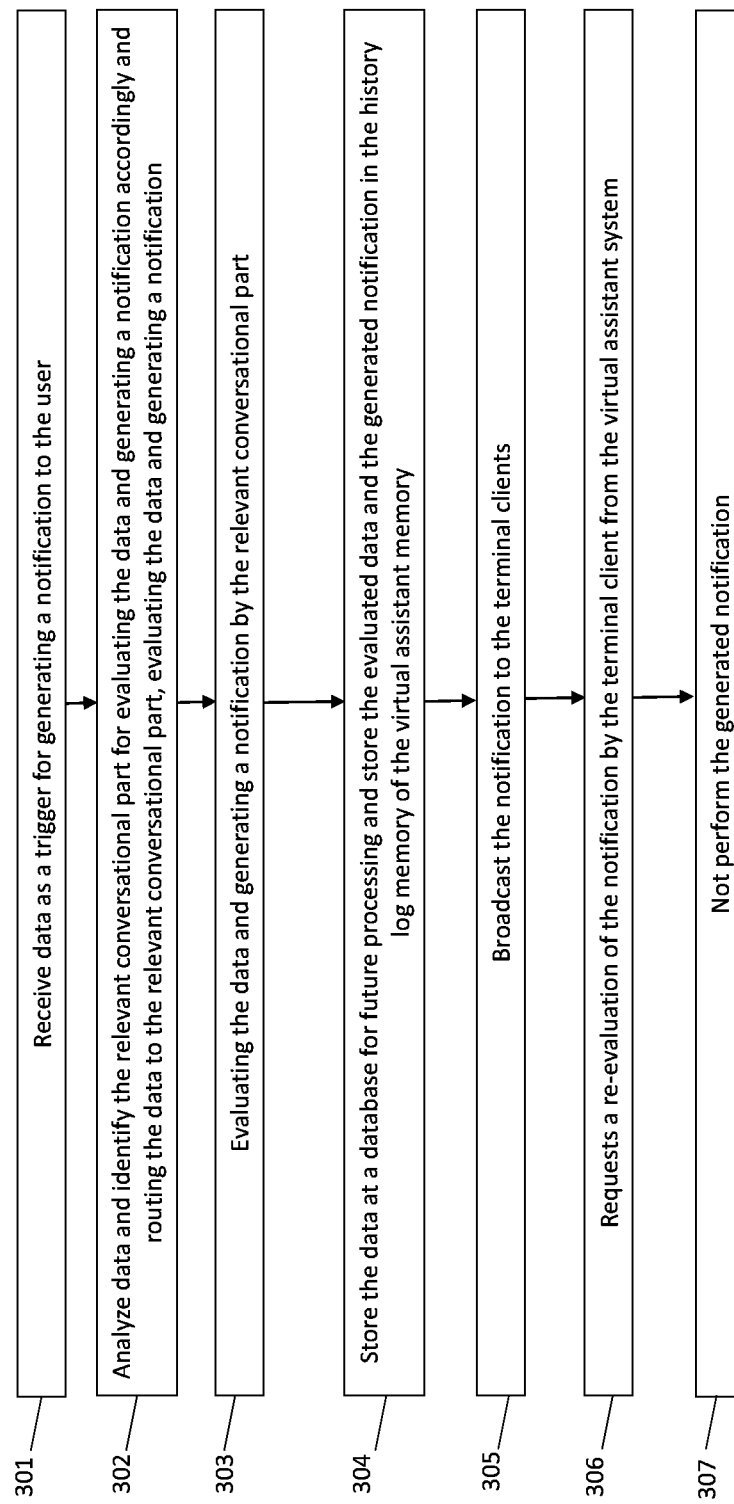
Figure 3:
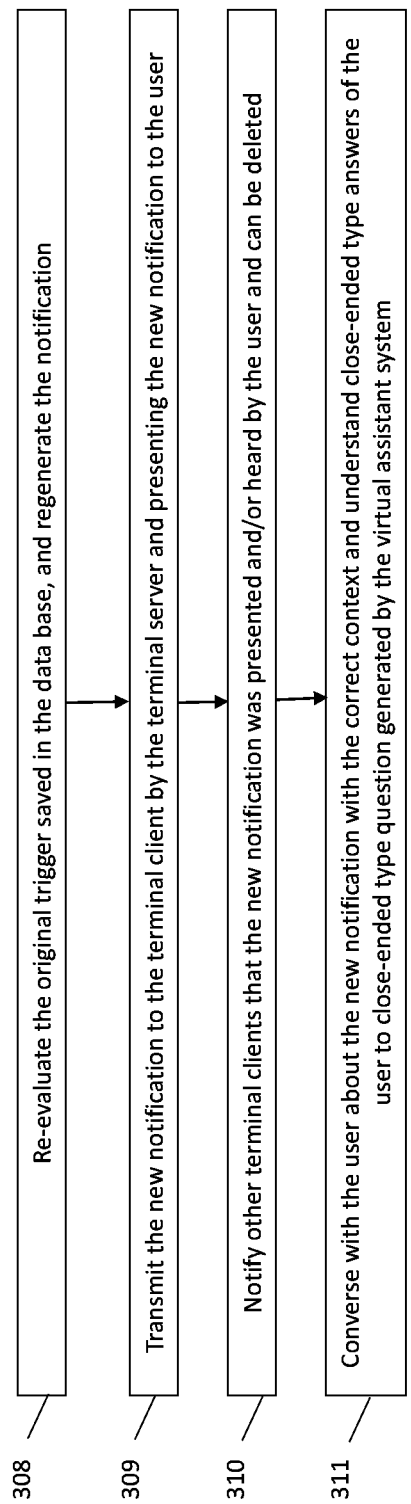

In the drawings:

FIG. 1 schematically shows a system for asynchronous notification for users in contextual interactive systems, according to some embodiments of the present disclosure;

FIG. 2 schematically shows a sequence diagram of the interaction between a terminal server and a terminal client of a virtual assistant system, according to some embodiments of the present disclosure; and FIG. 3 schematically shows a flowchart representing an optional flow of operations for a system and method for asynchronous notifications for users in contextual interactive systems, according to some embodiments of the present disclosure.

DETAILED DESCRIPTION

Some embodiments described in the present disclosure relate to methods and systems for asynchronous notifications for users in contextual interactive systems, and, more specifically, but not exclusively, to a method and system for proactively triggering notifications and close ended type questions in a virtual assistant system.

Natural conversations, heavily rely on context, therefore, any natural language virtual assistant system needs to store the current conversational context. In order to be able to have a conversation with a user about different subjects, the virtual assistant system usually includes several conversational parts, where each conversational part is responsible for a theme, and where each conversational part processes the information and the knowledge required for the conversation in accordance to the respective theme. For example, a conversational part responsible for the theme of weather processes the information regarding the weather forecast and the correct language for discussing this theme with the user. Another possible theme may be traffic, and then the conversational part responsible for the traffic theme processes the information regarding the traffics and the correct language to discuss about it with the user. A conversational context is made of things that might affect the conversation like a location in a modeled dialog tree, previous utterances, possible conversation paths, and the like. The conversational context enables the virtual assistant system to understand user utterances. For example, in a middle of a conversation between a user and the virtual assistant system, when the user says "eight", the virtual assistant system responds differently whether the previous utterance that the virtual assistant system said to the user was "How many people?" or "What time should I schedule it?". Sometimes, the user wishes the virtual assistant system notifies him of things that the user wants to know and which can be important for the user, without requesting it from the virtual assistant system. It is therefore desired to make the virtual assistant system proactive and to trigger notifications to the user without receiving a request from the user. The notifications triggered by the virtual assistant system are also referred to herein as asynchronous notifications. The above two facts—that conversations are contextual, and that virtual assistant system generated asynchronous notifications are desired, lead to a problem: the context of the notification, which is generated in a specific time, may change by the time the user consumes the notification. In addition, if the conversational part that generated the notification, or that the notification is relevant to, has been used by the user after the notification was generated, or is in current use by the user, then the context of the asynchronous notification generated by the virtual assistant system and the user initiated conversation may overwrite each other. This may lead to an unintelligible conversation and cause errors in the virtual assistant system service to the user. Three example scenarios where following up on a proactive notification is problematic, may be as follows:

a. the virtual assistant system sends multiple notifications to the user; the user decides to follow up on one of the notifications. If the conversational context of each notification is different, it means that a different conversational part is responsible for generating the notification, then the last notification would be the only one that the user is able to continue. This is because every notification which is generated by a conversational part is recorded at the history log memory of the virtual assistant system, and the generating conversational part of the notification stays active until for conversing with the user about the notification until the user close the conversation or until another conversation inserts to the history log memory. Therefore, in case that multiple notifications were sent to the user by the virtual assistant system, the conversational part that generated the last notification is active in the history log memory of the system and the rest of the conversational parts that generated the rest of the notification are not active;

b. the virtual assistant system sends a notification, the user ignores the notification or just does not see the notification, in the meantime the user continues conversing with the virtual assistant system, and later on the user comes back to the notification and decides to follow up on the notification. When the conversational context is overwritten by the user conversation with the virtual assistant system (i.e. when the conversational context is changed from the context of the generated notification to the context of the current conversation of the user with the virtual assistant system), then, when the user listens to the notification and replies to it, the conversational part that generated the notification is no longer active. However, the conversational part that is responsible for the theme of the conversation with the user that took place before the user consumed the notification is still active. So the reply of the user to the notification and to the close-ended question is meaningless to the virtual assistant system as the reply does not match the current active conversational part (which is the conversational part responsible for the conversational context of the conversation before the user consumed the notification); and c. the virtual assistant system sends a notification, by the time the user follows up on the notification the reason for the notification may changed (e.g. a traffic jam notification is sent, but by the time the user follows up with the notification there is no longer a traffic jam).

In all the cases above the virtual assistant system needs to know how to continue the conversation with the user with the correct conversational context which matches the specific notification i.e. the virtual assistant system needs to know what event happened and how the event effects the answer of the virtual assistant system to the user.

In addition, it would be valuable to finish an asynchronous notification with a close ended type question, to enable the virtual assistant system to provide a service for the user. For example, the virtual assistant system may say to the user "Your normal route is congested this morning, would you like me to find a better route for you?" and enable the user to continue a meaningful conversation by replying 'yes'.

Triggers for notifications can come from different sources:

generated by the virtual assistant system, for example by a code that is periodically or continuously running some calculations;

pushed by a third party or other services. i.e. received by the virtual assistant system; and polled by the virtual assistant system from a third party, either continuously or periodically.

The triggers could hold the exact text to tell the user or could be evaluated as input to the virtual assistant system in order to generate the text to be sent to the user.

The present disclosure, in some embodiments thereof, provides a system and a method for proactively generating a notification to the user, which evaluates the trigger as a new conversation, which is not related to a current conversation of the user with the virtual assistant system (the evaluation of the trigger as a new conversation may also be referred to herein as a clean and/or a default conversational context), and does not store the updated conversational context at the trigger evaluation time. This guarantees that when the user is in the middle of a conversation with the virtual assistant system, the generation of a new notification and the current conversation of the user with the virtual assistant system do not collide. According to the present disclosure, a re-evaluation of the trigger is done when the user requests to consume the notification. So that once the user consumes the notification, the conversational part responsible for the conversational context of the notification is active and is able to understand the user conversation about the notification and is able to understand the responses of the user to close-ended type questions generated by the virtual assistant system in the notification.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which schematically shows a system for asynchronous notification for users in contextual interactive systems, according to some embodiments of the present disclosure. System 100 is a virtual assistant system, which comprises a terminal server 110 and one or more terminal clients 120. The terminal server 110 includes different conversational parts 111. The different conversational parts are responsible to have a conversation with the user on different themes. Each conversational part is able to understand a conversation regarding a respective theme for which the conversational part is responsible. The conversational part provides the correct context for the virtual assistant system 100 to interact with the user. Each conversational part generates the correct sentences for the virtual assistant system 100, according to a predefined model. For example, a conversational part may be responsible for the theme of traffic, weather, meetings and the like. Therefore, in a conversation regarding traffic, the conversational part responsible for traffic generates all the sentences when interacting with the user. The terminal server also includes a history log memory 112, for storing the order of conversations with the user. In some embodiments of the present disclosure, according to the history log memory 112, the terminal server 110 of the virtual assistant system 100 knows to what theme a current conversation with the user belongs. Moreover, the virtual assistant system knows which conversational part is responsible for generating the sentences for interacting with the user relating to the theme of the current conversation. The terminal server also has its own conversational context. The context of the terminal server may be based on the history log memory to know the conversations that took part in the past and also to be aware of the context of the current conversation and may be based on other inputs and data of the system. According to some embodiments, the terminal server may assess when more than one contextual parts are necessary for a conversation and let each conversational part generate the relevant sentences related to the respective theme in the conversation. The terminal server makes sure the one or more conversational parts of the current conversation stay active and the conversational parts of past conversations, which are not necessary for the current conversation or for future conversation turns inactive. In addition, terminal server 110 includes a database 113 for storing data and information for future use. The terminal server 110 is connected to one or more end devices, which are terminal clients 120. A terminal client 120 is an end device, which interacts with a user, and therefore is aware of the user state, and in some cases is aware of the user environment. Therefore, according to some embodiments of the present disclosure, the terminal client may be the part of the system, which is responsible to decide when to indicate to the user about a new notification that has been received. According to some other embodiments of the present disclosure, the terminal server may be the part of the system, which is responsible to decide when to indicate to the user about a new notification that has been received. The terminal client 120 also reflects to the terminal server 110, which notification was delivered to the user successfully. According to some embodiments of the present disclosure, the terminal server is also connected to an external network such as the internet for receiving data and updating data.

According to some embodiments of the present disclosure, another possible implementation of the system may be a machine learning implementation for example using a learned neural network with context. In this implementation, the context modifications generated in the first evaluation is not performed, and the first evaluation is done based on the clean state context, which mean the evaluation is based on context of past conversation only, and not based on the actual real-time context, to avoid interference with an ongoing conversation.

Reference is now made to FIG. 2, which schematically shows a sequence diagram of the interaction between the terminal server 110 and the terminal client 120 of the virtual assistant system 100, according to some embodiments of the present disclosure. At 201, the terminal server receives data indicative of a change of a service related state associated with the user of the terminal client 120. According to some embodiments of the present disclosure, the data may be from a third party or from a part of the system that generated data, for example, a code that run a calculation constantly or periodically. At 202, according to some embodiments of the present disclosure, the terminal server accesses a storage of the service related state to generate a notification and a close-ended type question to the user based on the data stored in the storage of the service related state. According to some embodiments of the present disclosure, the data may be stored in an external storage of the service related state or the data may be stored in an internal database 113 of the system. The terminal server analyzes the data and identifies the correct conversational part, which is the most appropriate to handle the received data and to generate a notification and a close-ended type question accordingly. At 203, the terminal server and the conversational part evaluate the data, the terminal server stores the evaluation results in the history log memory of the system and the conversational part generates a notification and a close-ended type question according to the correct context of the data in the correct language. Then at 204, the terminal server 110 instructs to transmit the notification to the terminal client 120, to deliver the notification and a close-ended type question to the user. The notification and a close-ended type question are recorded at the history log memory together with the evaluation result. In some embodiments of the present disclosure, the evaluation result, the notification and the close-ended type question are based on a clean state or default state, which is a state that is not influenced by an ongoing conversation of the user with the virtual assistant system, in order to avoid interference with the ongoing conversation. The evaluation result, the notification and the close-ended type question are stored at the history log memory of the virtual assistant system. In addition, in some embodiments of the present disclosure, some of the context changes generated as a result of the notification evaluation in the terminal server and the conversational part are not saved so that the evaluation does not interfere with the ongoing conversation. At 205, the terminal client waits for a proper time to notify the notification and the close-ended type question to the user or waits for a time the terminal client identifies the notification is about to be consumed by the user. Then, at 206, the terminal client 120 sends a request to the terminal server 110 to retransmit the notification and the close-ended type question. The retransmission is requested for re-evaluating the notification and the close-ended type question before it is provided to the user or before the user consumes the notification. That is because: (a) time has passed between the moment the notification was generated and between the moment the notification is consumed by the user and the data in the notification may have changed, and (b) the relevant conversational part may not be active, i.e., may not be in the correct context of understanding a close-ended type answer of the user to the close-ended type question and providing the user a correct response to the user. In addition, the terminal server is not aware that the user is responding to the consumed notification of an inactive conversational part on the one hand and the relevant conversational part needs to know that it is in the middle of a conversation flow on the other hand, to be able to understand the closed-ended type answer of the user. In response to the retransmission request, the terminal server at 207, erases the evaluation, the notification and the close-ended type question from the history log memory of the virtual assistant system. In some embodiments of the present disclosure the evaluation, the notification and the close-ended type question are not performed and may be erased from the history log memory and optionally stored in the database 113 for future use. Alternatively, the evaluation, the notification and the close-ended type question may simply be skipped or ignored. At 208, according to some embodiments of the present disclosure, the data is retrieved from either the storage of the service related state or from the internal database 113, and a re-evaluation of the data is carried out. Accordingly, a new notification and a new close-ended type question are generated according to the re-evaluated data and the new notification and new close-ended type question are recorded at the history log memory of the virtual assistant system. This way, the terminal server is being aware of the question that was asked by the relevant conversational part and can use this information in routing an incoming utterance from the user, including a short answer that does not contain any context in it. In addition, the conversational part responsible for the theme of the new notification is activated, in the meaning of being aware it is in a middle of a conversation flow and to be able to understand an incoming utterance from the user, a close-ended type answer of the user of the like and provide proper responses. Then, at 209, the terminal server 110 instruct transmitting the new notification and the new close-ended type question to the terminal client 120 to deliver to the user. At 210, the new notification and new close-ended type question are provided to the user or are consumed by the user. At 211, the terminal server of the virtual assistant system understands a response from the user to the new notification and/or to the new close-ended type question. At 212, the conversational part responsible for the new notification provides correct responses to the user regarding the new notification. According to some embodiments of the present disclosure, the terminal server 110 may send the notification to more than one terminal clients. Once the notification is delivered to the user by one of the terminal clients, the terminal server announce to the rest of terminal clients that the notification was delivered to the user and the other terminal clients delete the notification from their list of pending notifications to avoid repetitive notifications. The terminal client, which delivered the notification to the user, reflects it to the terminal server. This way, the notification is consumed by the user when it is updated. In addition, the system is aware about the notification being consumed by the user and that the user is responding to the notification. Moreover, the proper conversational part responsible for the notification is active in the meaning of being aware it is in a middle of a conversation flow and is able to understand an incoming utterance from the user, and may converse with the user about the notification. So the conversational part responsible for the notification is able to understand a close-ended type response from the user to the close-ended type question triggered by the virtual assistant system in the notification.

According to some embodiments of the disclosure, the terminal client may be an end device, for example: a mobile device, a smart speaker, a smart speaker that is integrated into other physical device such as a car, a room or home appliance and the like. Each end device may have different capabilities and different way to interface notifications to the user. For example: some devices have screens, some can vibrate and other may flash lights. Some of the devices may have different information about the user, for example, a smart car may know that the user is in it and that he is going to be in the car at least for next five seconds in case the car is moving in a velocity of 60 mph. A smart room may know that the user is in it. The smart room may also know when another conversation is taking place in the room. Since the end devices connected to the terminal server as terminal clients are responsible for the interaction with the user and are aware of the user state, the terminal clients may be responsible for deciding when is the proper time to deliver the notifications received from the terminal server to the user.

FIG. 3 schematically shows a flowchart representing a method for asynchronous notifications for users in contextual interactive systems, according to some embodiments of the present disclosure. The method comprises two main parts. The first part is the part of the data ingestion. First, at 301, a trigger is received by the terminal server of the virtual assistant system. The terminal server processes the trigger to understand to what conversational context this trigger belongs and then at 302, the trigger is routed by the terminal server to the relevant conversational part of the virtual assistant system, which is responsible for the conversational context of the received trigger. At 303, the conversational part generates a notification to be presented to the user with the proper language and the proper contextual context. The text of the notification is generated at this stage since some terminal clients present the notification text to the user immediately after the notification is received, even before the users performs any action.

In some embodiments of the present disclosure, the text needs to be generated per user by the virtual assistant system and the relevant conversational part. The text is generated by the conversational part or by the terminal server according to the specific model of the conversational part responsible for the conversational context of the notification. According to some embodiments of the present disclosure, the virtual assistant system may modify to some extent the text that was generated by the conversational part, before the text is presented to the user.

Moreover, the text is generated according to different rules for example, personalization parameters such as personalized priority. The personalization may be added by the conversational part or by the terminal server of the system after the original text is created by the conversational part. Also, the virtual assistant system may be aware of other aspects of the user such as environment and conversational context that might affect the generated text.

At 304, any related and needed data is stored for later processing at an internal database. According to some embodiments of the disclosure, the data may be stored at a storage of the service related state, which provided the trigger for the notification, for example when the data changes constantly. The notification generated by the relevant conversational part is stored at a history log memory of the virtual assistant system. At 305, after the generated notification is transmitted to all the terminal clients of the user, i.e. to all the end devices of the user, which are connected to the virtual assistant system, each terminal client (i.e. each end device) may decide what to do with the notification. Whether to present the notification on a screen, to flash a light, to vibrate, to immediately speak out, or any other behavior. For example—a car can know that the user is in it and that the user may hear a notification when the notification is spoken out, by knowing the state of the environment. For example, in one case, when the car is moving at a high speed, the car knows that it is now on a highway, the car knows there is no music being played in the car, and the car knows there is no ongoing conversation between the passengers of the car, therefor the car may decide to present the notification at this time. In a second case, the car can be aware of the condition of the road—such as is there a loud noise from a passing truck, is the car in the middle of a junction or approaching a junction or some other problematic part of the road that requires the full attention of a driver—and may cause the car to decide not to present any notification to the driver. In a third case, the car could identify that the user is expressing signs of drowsiness and in response, the car initiates a conversation about notifications that it might otherwise wait with.

Other terminal clients may have less knowledge of the environment and cannot tell whether a notification may be spoken out at any given point of time and be heard by the user. According to some embodiments of the present disclosure, the terminal client may also be in the middle of a conversation with the user, and waits until the conversation finishes to add that a notification has been received. For example at the end of the conversation with the user, a terminal client, which is a smart speaker, may say, "I did what you requested. By the way, you just got a notification that . . . ".

The second part of the method is the notification delivery. According to some embodiments of the disclosure, at 306, when the user interacts with the terminal client and requests to get the notification, then the device requests a re-evaluation of the notification by the virtual assistant system. The user may consume the notification either by explicitly asking the terminal client, or by other means such as clicking on a notification 'card' on a mobile phone, or by opening the virtual assistant system application and the relevant screen. The re-evaluation request causes the terminal server of the virtual assistant system to not perform the generated notification recorded on the history log memory of the virtual assistant system at 307. According to some embodiments of the present disclosure, the not performed notification may be erased from the history log memory and optionally stored at database 113 for future use. Alternatively, the not performed notification may be simply skipped and ignored. Then at 308, the relevant conversational part and the virtual assistant system re-evaluate the original trigger saved in the internal database, possibly with updated values from any source, and regenerate the notification text and with the close-ended type question. In some embodiments of the present disclosure, the data of the original trigger is stored at the storage of the service related state, for example, when it is data that changes constantly. The new regenerated notification with the close-ended type question, are recorded at the history log memory of the virtual assistant system. This causes the virtual assistant system and the relevant conversational part to get into the relevant conversational context. For example, as a result of the re-evaluation of the trigger and the generation of the new notification, the terminal server and the conversational part get into the conversational state of 'asked the user a question about a taxi'. Keeping to this example, this allows the user to say "yes" and the virtual assistant system to understand that the user is not only in the middle of a conversation with the specific conversational part, but also the conversational part to understand the utterance 'yes'. To clarify, without the re-evaluation, the conversational part and the virtual assistant system might have already been in a different state, because of conversations that the user had with the virtual assistant system that are not related to the notification. In such a case, the utterance 'yes' would not have been understood by the virtual assistant system nor by the conversational part.

At 309, the new notification is transmitted to the terminal client by the terminal server. This time the notification is presented to the user. At 310, other terminal clients are notified that the notification was presented and/or heard by the user and can be deleted. Finally at 311, the user may continue a conversation with the virtual assistant system about the notification with the correct context. As a result, the virtual assistant system and the relevant conversational part are able to understand the response of the user to a close-ended type question triggered by the virtual assistant system.

According to some embodiments of the present disclosure, end devices used for interaction with the user are continuously updated with the status of the notifications. The end devices control the time the notification is presented to the user, based on when the user finishes a conversation, and is ready to accept the notification, or when the user is conversing about something less important. According to some embodiments of the present disclosure, the priority of the notification may be sent to the device with the notification itself.

This way, the user is able to hear a notification that ends with a close-ended type question and answer a short close ended type response as "yes" and the virtual assistant system and the relevant conversational parts of the virtual assistant system are able to continue the conversation. Even when the user is in a middle of a conversation with the relevant conversational parts when the trigger was received, and the notification is generated, the user can hear the triggered notification, answer a close-ended type response and the virtual assistant system understands the user answer. This is true also in cases the user has a conversation after the notification is generated and before the user consumes to the notification.

The following is an example for a close-ended type question triggered by the virtual assistant system. A user is driving to work in a smart car and is conversing with the virtual assistant system via the smart car regarding the weather. The terminal server then knows the conversation with the user relates to the theme of weather and the conversational part responsible for weather is active. During the conversation with the user, the terminal server of the virtual assistant system receives data about traffic. The terminal server then, analyzes the received data, sores the data in the internal database for future use and identifies the data relates to traffic jam on the way to work of the user. Therefore, the terminal server of the virtual assistant system decides to generate a notification regarding the traffic jam and to trigger a close-ended type question to the user asking if the user wishes to find an alternative route. The terminal server sends the received data to the conversational part responsible for traffic, to generate a correct text for the notification regarding the traffic jam. The conversational part responsible for traffic generates a notification for the user regarding the traffic jam. The conversational part also generates a close-ended type question at the end of the notification, for example: "There is a traffic jam on you regular route to work, should I find you an alternative route?". The terminal server sends the notification to two terminal clients, which are currently connected to the virtual assistant system. The terminal clients are a smart room at the house of the user and the smart car of the user, in which the user is driving now. Once the notification is sent to the terminal clients, the notification is recorded at the history log memory of the virtual assistant system. However, since the user is in the middle of a conversation with the virtual assistant system regarding another theme (weather) the notification is not delivered immediately to the user and therefore the conversational part responsible to traffic is not activated to converse with the user and the terminal server of the user knows that the current conversation relates to weather. Since the user is in the smart car, the smart car is the terminal client, which interacts with the user when the notification is received. During the conversation with the user regarding the weather, the smart car terminal client identifies a good time to deliver the notification received to the user. The terminal client then requests from the terminal server a retransmission of the notification including the close-ended type question. In response to the retransmission request from the terminal client, the terminal server does not perform the notification with the close-ended type question recorded on the history log memory of the virtual assistant system. According to some embodiments of the present disclosure, the notification with the close-ended type question is erased and optionally stored at the database for future use. Alternatively, the notification with the close-ended type question may be skipped and ignored. Then, the terminal server accesses the internal database and the source of the received data stored in the database, to generate a new notification with updated data. In some embodiments of the present disclosure, the terminal server accesses the storage of the service related state with the relevant data for the notification to update the notification. The terminal server sends the updated data to the conversational part responsible for traffic and the conversational part responsible for traffic generates a new updated notification with a close-ended type question at the end of the notification. The terminal server instructs transmitting the new updated notification to the terminal clients. The new notification is recorded at the history log memory of the virtual assistant system and the new updated notification is delivered to the user by the smart car. Since the new notification is delivered immediately, the terminal server knows the notification now delivered to the user is regarding traffic and the conversational part responsible for traffic is also active to be able to understand responses from the user to the notification and to provide correct contextual feedback to the user. The smart car, which is the terminal client interacting with the user currently, tells to the user, for example: "there are traffic on your regular route to work, should I find you an alternative route?". The user answers simply "yes" and the virtual assistant system understands the response relates to the close-ended type question in the theme of traffic and the conversational part responsible for traffic also understands the response and an alternative route is provided to the user. The terminal server notifies the rest terminal clients, i.e. the smart room that the notification was successfully delivered the user and the so the rest terminal client can erase the notification from their memory to avoid repetitive notifications.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems for proactively triggering notifications and close-ended type questions in virtual assistant systems will be developed and the scope of the term methods and systems for proactively triggering notifications and close-ended type questions in virtual assistant systems is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting.

What is claimed is:

1. A terminal server of a virtual assistant system for proactively triggering notifications, the terminal server configured to:
   receive data indicative of a change of a service related state associated with a user of at least one terminal client;
   access a storage of the service related state to generate accordingly a close-ended type question;
   instruct a transmission of the close-ended type question to the at least one terminal client;
   in response to a retransmission request received from the at least one terminal client in relation to the transmission and before the close-ended type question is provided to the user:
     not perform the close-ended type question;
     access the storage of the service related state to retrieve data from the storage of the service related state;
     carry out a re-evaluation of the close-ended type question based on the retrieved data, the re-evaluation determining at least that time has passed and data in the close-ended type question has changed or that a context of the close-ended type question has changed;
     generate a new close-ended type question according to the re-evaluation; and
     instruct transmission of the new close-ended type question to the at least one terminal client;
   analyze a closed type answer provided by the user of the at least one terminal client to the new close-ended type question; and
   instruct transmission of a current response to the closed type answer provided by the user.

2. The terminal server of claim 1, further configured to record the new close-ended type question at a history log memory, thereby activating a conversational part, which is responsible for a theme of the new close-ended type question, to be aware the conversational part is in a middle of a conversation flow and to be able to understand an incoming utterance from the user and to keep the virtual assistant system aware of a conversational context of the conversation flow regarding the new close-ended type question with the user.

3. The terminal server of claim 1, further configured to:
   delete the not performed close-ended type question from a history log memory; or
   delete the not performed close-ended type question from the history log memory and store the not performed close-ended type question in a database for future use; or
   skip the not performed close-ended type question.

4. A terminal client of a virtual assistant system for proactively triggering notifications, configured to:
   in a first time interval, receive a close-ended type question relating to a change of a service related state associated with a user from a terminal server of the virtual assistant system to trigger to the user;
   identify a time to ask the user the close-ended type question and, before the close-ended type question is provided to the user, request a re-evaluation of data upon which the close-ended type question is based and a transmission of a new close-ended type question from the terminal server in a delay from the first time interval, the re-evaluation determining at least that time has passed and data in the close-ended type question has changed or that a context of the close-ended type question has changed;

receive the new close-ended type question; and ask the new close-ended type question to the user; and provide a current response to a closed type answer provided by the user.

5. The terminal client of claim 4, wherein identifying the time to ask the user the close-ended type question is done when the user triggers consumption of a notification.

6. The terminal client of claim 4, wherein asking the new close-ended question to the user is done as a response to a trigger from the user or proactively without receiving any trigger from the user.

7. A method of managing a virtual assistant system, the method comprising:

receiving data indicative of a service related state associated with a user of a terminal client;

transmitting a first type of close-ended type question by accessing a storage of the service related state; and in response to a retransmission request received from the terminal client in relation to the transmission and before the first type of close-ended type question is provided to the user:

accessing the storage of the service related state to retrieve data from the storage of the service related state;

carrying out a re-evaluation of the first type of close-ended type question based on the retrieved data, the re-evaluation determining at least that time has passed and data in the first type of close-ended type question has changed or that a context of the first type of close-ended type question has changed;

generate a new type of close-ended type question according to the re-evaluation; and transmitting the new type of close-ended question to the terminal client; and receiving a closed type answer to the new type of close-ended question from the user of the terminal client; and transmitting a current response to the closed type answer provided by the user.

\* \* \* \* \*